United States Patent [19]

Araki

[11] Patent Number: 6,094,658

[45] Date of Patent: Jul. 25, 2000

[54] TEAMWORK CAD SYSTEM AND PROCESS FOR TEAMWORK DESIGNING

[75] Inventor: Hiromi Araki, Chita, Japan

[73] Assignee: Toyota Jidosha Kabushiki Kaisha, Japan

[21] Appl. No.: 08/022,922

[22] Filed: Feb. 26, 1993

[30] Foreign Application Priority Data

Feb. 27, 1992 [JP] Japan .................................... 4-041727

[51] Int. Cl.[7] .................................................. G06F 17/30
[52] U.S. Cl. ............................................ 707/104; 707/10
[58] Field of Search .................................. 395/600, 161, 395/162, 325; 707/10, 104

[56] References Cited

U.S. PATENT DOCUMENTS

| | | | |
|---|---|---|---|
| 4,974,173 | 11/1990 | Stefik et al. . | |
| 5,008,853 | 4/1991 | Bly et al. | 364/900 |
| 5,027,290 | 6/1991 | Kirk et al. | 364/521 |
| 5,128,878 | 7/1992 | Gore et al. | 395/162 |
| 5,282,273 | 1/1994 | Ushio et al. | 395/325 |
| 5,293,479 | 3/1994 | Quintero et al. | 395/161 |

FOREIGN PATENT DOCUMENTS 0 319 232   6/1989   European Pat. Off. .

OTHER PUBLICATIONS

Phillip Robinson, "Sophisticated Mac CAD Aids Work Group Efforts", *MacWeek,* vol: v3, Issue: n16, Apr, 18, 1989, p32–34.

Hardwick et al., "Using a Relational Database as an Index to a Distributed Object Database in Engineering Design Systems", *Second International Conference on Data and Knowledge Systems for Manufacturing and Engineering,* Oct. 16–18, 1989, p4–11.

Laura Lang, "Network–Ready PC CAD: Architectural Firms Face the Challenge of Sorting Out the Contenders and Their Claims", *Computer Graphics World,* vol: v13, Issue: n11, Nov., 1990, p111–113.

Greg Freiherr, "CAD on the High Frontier", *Computer Graphics World,* vol: v13, Issue: n11, Nov., 1990, p54–61.

John Pallatto, "TeamNet Update Eases Tracking of Design Data", *PC Week,* vol: v7, issue n51, Dec. 24, 1990, p29–30.

"Shared Books: Collaborative Publication Management for an Office Information System", pp. 197–204, (authors: Brian T. Lewis & Jeffrey D. Hodges), ACM Conference on Office Information Systems, Palo Alto, Calif., Mar. 25, 1988.

Search Report dated Nov. 29, 1993.

Communication dated Dec. 2, 1993.

Copy of Canadian Office Action dated Oct. 21, 1997.

*Primary Examiner*—Thomas G. Black
*Assistant Examiner*—Frantz Coby
*Attorney, Agent, or Firm*—Finnegan, Henderson, Farabow, Garrett & Dunner, L.L.P.

[57] ABSTRACT

A teamwork CAD system which enables each designer to refer to the latest information on another part which has a relationship to the part under his control. A part shape data base stores the data on the shape of each part and a part control data base registers the designer who is designing or modifying each part and the designer who is referring to the part. A plurality of data processing units are allotted to a plurality of designers who are designing in parallel the parts of the object. When a designer (e.g., b) modifies the part Y under his control, the nature of the modification are transmitted to the part shape data base and the fact that modification has taken place and the nature thereof are transmitted to the terminal data processing unit of the designer (e.g., a) who is referring to the part Y. The latest shape of the part Y is then displayed on the display unit of the designer a in approximate real time, so that the designer a can design the part X under his control with reference to the modified part Y.

10 Claims, 4 Drawing Sheets

| PART | DM | DR | DM | -------- |
|------|----|----|----|----------|
| X | a | b |   | -------- |
| Y | b | a |   | -------- |
| Z | c | a | b | -------- |
| ⋮ | ⋮ | ⋮ | ⋮ |          |

DM : DESIGNER WHO IS MODIFYING THE PART.
DR : DESIGNER WHO IS REFFERRING TO THE PART.

TEAMWORK CAD SYSTEM AND PROCESS FOR TEAMWORK DESIGNING

BACKGROUND OF THE INVENTION

1. Field of the Invention

The present invention relates to a CAD system and, more particularly, to a process for teamwork designing to enable a plurality of designers to design an object by designing in parallel the respective parts of the object to which they have been assigned.

2. Description of the Related Art

In designing a large object composed of a multiplicity of parts, for example, an automobile, a teamwork designing system is adopted. In the teamwork designing system, a life-size design drawing is prepared and it is divided into a plurality of portions to which a plurality of designers are assigned. Each designer designs the portion to which he has been assigned while referring to adjacent parts and taking the relationship and the gap between the part under his control and adjacent parts, etc. into consideration. If the design of another part is modified, the designer for the part which has relation thereto always confirms the modified part. In such a designing system, the designers are therefore in comparatively close communication with each other.

In contrast with such a traditional technique, with the recent rapid generalization of a what is called CAD (Computer Aided Design), a teamwork CAD system has been introduced. In this system, the structure of the object is represented by a tree structure, and a plurality of designers simultaneously design the parts under their own control using their respective terminal processing units, thereby improving the efficiency of designing and shortening the time required for designing. In this teamwork CAD system, it is necessary to prevent a plurality of designers from modifying one part at the same time. For the purpose of smooth progress of designing which prevents such an overlapping modification, the modification information which indicate by whom and when a part was modified is controlled as described in, for example, Japanese Patent Laid-Open No. Hei 2-48774.

In addition, since it is necessary for each designer to take the interference between the part in his charge and another part into consideration, the CAD system enables the display unit of each terminal processing unit to display the necessary part every time the designer demands it for reference.

In the conventional CAD system, however, a designer cannot know the latest shape of another part which is being designed by another designer in real time. In other words, while a designer a is referring to a part X which is under the control of another designer b, if the part X is modified by the designer b, the information on the modified shape is not transmitted to the designer a.

That is, the communication between the designers is somewhat deteriorated in comparison with the communication in the teamwork designing system before the CAD system was introduced. As a result, in spite of a reduction in the time required for designing by each designer, it is impossible to enhance the efficiency of designing as a whole and to improve the quality of the design.

SUMMARY OF THE INVENTION

Accordingly, it is an object of the present invention to eliminate the above-described problems in the related art and to provide a teamwork CAD system and a process for teamwork designing which enable each designer to refer to the latest information on another part which has a relationship with the part under his control.

To achieve this aim, the present invention provides a teamwork CAD system for designing an object by a plurality of designers who design in parallel the respective parts of the object to which they have been assigned by the respective data processing units, the system comprising: a part shape data base for storing the data on the shape of each part; a part control data base for registering the data on the designer who is designing or modifying each part at each point of time in correspondence with the data on the designer who is referring to the part; and a data control unit for updating the corresponding part shape data in the part shape data base in accordance with the nature of the modification when a part is modified in one of the data processing units, for retrieving and extracting the designer who is referring to the part which has been modified from the part control data base, and for transmitting the fact that the part has been modified and the nature of the modification to the data processing unit of the extracted designer.

According to the CAD system of the present invention, when a part is modified, the fact that the part has been modified and the nature of the modification are transmitted to the designer which is referring to the part. It is therefore possible for each designer to know the latest state of the part to which he is referring in approximate real time.

The above and other objects, features and advantages of the present invention will become clear from the following description of the preferred embodiments thereof, taken in conjunction with the accompanying drawings.

DESCRIPTION OF THE PREFERRED EMBODIMENTS

The present invention will be explained in more detail with reference to embodiments.

Figure 1:
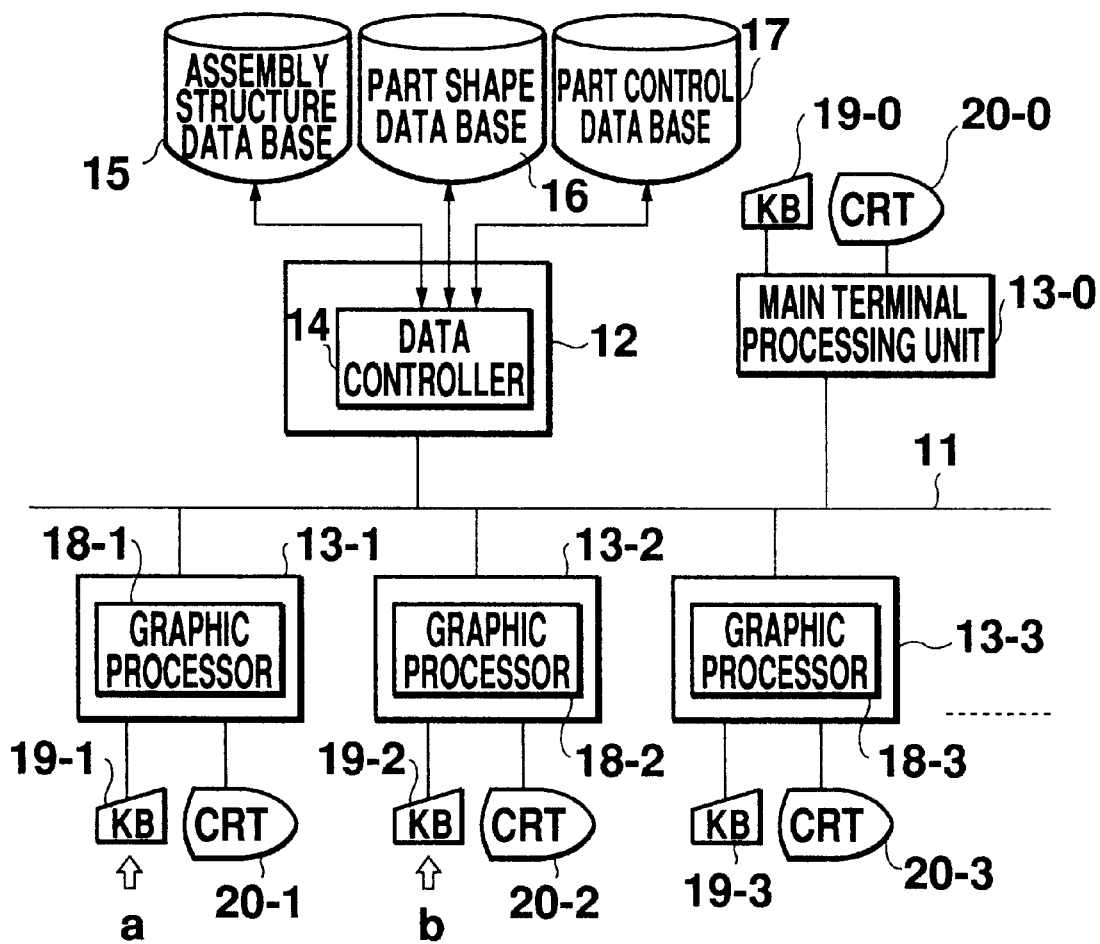
FIG. 1 is a block diagram of an embodiment of a teamwork CAD system according to the present invention.

FIG. 1 is a block diagram of an embodiment of a teamwork CAD system according to the present invention. This system is provided with a central processing unit 12, a main terminal unit 13-0, and a plurality of terminal data processing units 13-1, 13-2, ... all of which are connected to each other by a network 11. The central processing unit 12 is provided with a data controller 14 which controls the data in an assembly structure data base 15, a part shape data base 16 and a part control data base 17.

The terminal data processing unit 13-1 is provided with a graphic processor 18-1 which forms and compiles a graphic in accordance with the input from a keyboard (KB) 19-1 or a mouse (not shown) and displays the result on a display unit (CRT) 20-1. The other terminal data processing units 13-2, ... have the same structure. The designers use these terminal data processing units respectively and design the various parts of an object in parallel.

The main terminal unit 13-0 is provided with a large display unit 20-0 which enables a designer to synthetically confirm the nature of the modification of each part in the corresponding terminal data processing unit by operating a keyboard 19-0. By virtue of the display unit 20-0, the design team leader can easily grasp the progress of the design of each part and the entire state of designing.

The assembly structure data base 15 represents the structure of the parts of an object of designing in a tree structure. For example, the structure is represented by a tree structure indicating, "An assembly A is composed of parts X, Y and Z", as shown in FIG. 2.

The part shape data base 16 is composed of data on the shape, the dimensions, etc. of each part which is registered in the assembly structure data base 15.

Figures 2, 3:
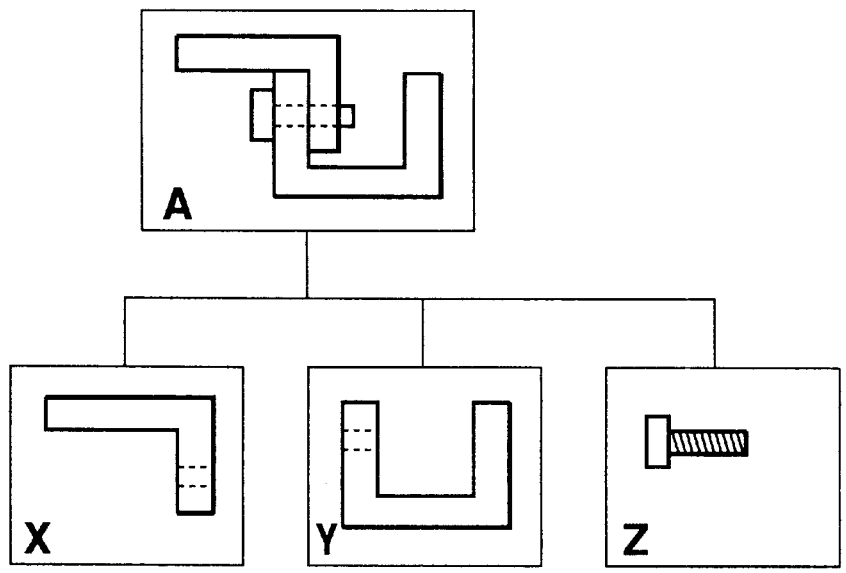
FIG. 2 is an explanatory view of the data structure in the assembly structure data base in the embodiment shown in in FIG. 1.
FIG. 3 is an explanatory view of an example of the contents of the part control data base in the embodiment shown in in FIG. 1.

The part control data base 17 is used to maintain information concerning the designer who is modifying or referring to each part, and has a structure such as that shown in FIG. 3. The part control data base 17 shown in FIG. 3 is for the assembly structure shown in FIG. 2. For example, a designer a is registered in the column of the DM (designer who is modifying the part) of the part X and, a designer b is registered in the column of the DR (designer who is referring to the part) of the part X. This indicates that the part X is being modified by the designer a and is being referred to by the designer b. It is also possible to register a plurality of designers a and b, as in the column of the part Z in the part control data base 17.

The operation of the CAD system having the above-described structure will now be explained with reference to FIG. 4. It is now assumed that the designer a at the terminal data processing unit 13-1 and the designer b at the terminal data processing unit 13-2 refer to the parts Y and X, respectively, when they are designing the parts X and Y, respectively.

Figure 4:
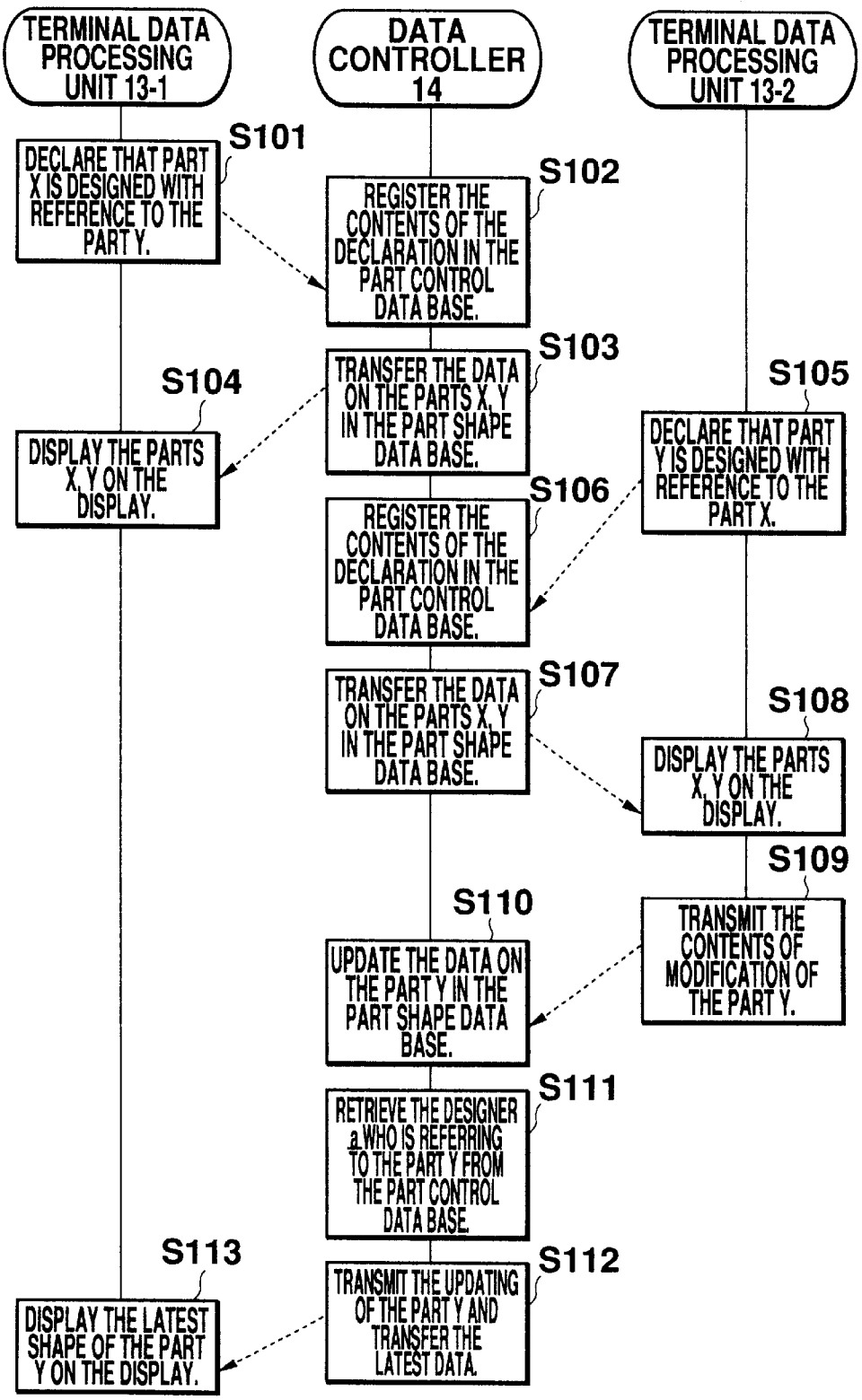
FIG. 4 is a flowchart of the operation of the embodiment shown in FIG. 1.

When the designer a inputs a declaration indicating that he designs the part X with reference to the part Y by operating the keyboard 19-1 of the terminal data processing unit 13-1, the communication controller (not shown) in the terminal data processing unit 13-1 transmits the declaration to the data controller 14 in the central processing unit 12 through the network 11 (step S101 in FIG. 4). The data controller 14 in the central processing unit 12 which has received the declaration registers the contents of the declaration in the part control data base 17 (step S102). By this processing, "the designer a" is registered in the column of the DM of the part X and in the column of the DR of the part Y in the part control data base 17. It is preferable to use an identification (ID) code or the like of the terminal data processing unit as the information which indicates the designer.

The data controller 14 reads the shape data on the parts X and Y from the part shape data base 16 and transfers the data to the terminal data processing unit 13-1 (step S103). The graphic processor 18-1 of the terminal data processing unit 13-1 then displays the shape, the dimensions or the like of the parts X and Y on the display unit 20-1 (step S104). At this time, the display unit 20-1 displays the part X as the object of modification and the part Y as the object of reference in different colors in the actually assembled state, so that the designer a can easily check the relative interference between the parts X and Y.

When the designer b inputs a declaration indicating that he designs the part Y with reference to the part X by operating the keyboard 19-2 of the terminal data processing unit 13-2, the communication controller (not shown) in the terminal data processing unit 13-2 transmits the declaration to the data controller 14 in the central processing unit 12 through the network 11 (step S105).

The data controller 14 in the central processing unit 12 which has received the declaration registers the contents of the declaration in the part control data base 17 (step S106). By this processing, "the designer b" is registered in the column of the DM of the part Y and in the column of the DR of the part X in the part control data base 17.

The data controller 14 reads the shape data on the parts X and Y from the part shape data base 16 and transfers the data to the terminal data processing unit 13-2 (step S107). The graphic processor 18-2 of the terminal data processing unit 13-2 then displays the shape, the dimensions or the like of the parts X and Y on the display unit 20-2 (step S108). At this time, the display unit 20-2 displays the part Y as the object of modification and the part X as the object of reference in different colors.

At this point of time, if the designer b, for example, modifies the shape or the like of the part by operating the keyboard 19-2 or the mouse, the nature of the modification is transmitted to the data controller 14 (step S109). The data controller 14 then not only updates the shape data on the corresponding part Y in the part shape data base 16 (step S110), but also retrieves and extracts the "designer a" who is referring to the part Y from the part control data base 17 (step S111). The data controller 14 transmits the fact that the shape data on the part Y have been updated to the terminal data processing unit 13-1 which the designer a is using and transfers the latest data containing the modification to the terminal data processing unit 13-1 (step S112). The graphic processor 18-1 of the terminal data processing unit 13-1 then displays the latest shape of the part Y (step S113). In this way, the designer a can design the part X in his charge while referring to the latest shape of the part Y in approximate real time.

The data controller 14 of the central processing unit 12 transfers the latest shape data to the main terminal processing unit 13-0 as well as the terminal data processing unit 13-1 at step S112. The display unit 20-0 therefore displays the assembly of the parts each having the latest shape, thereby enabling the design team leader to grasp the overall progress of designing in approximate real time.

In this embodiment, the designer who is referring to the part Y is only the designer a. It goes without saying that if there are two designers a and b who are referring to a part as the part Z in FIG. 3, the nature of the modification is transmitted to the terminal data processing units 13-1 and 13-2 of the designers a and b. This is the same with the case in which there are three or more designers who are referring to a part, and the nature of the modification is transmitted to the corresponding designers.

Figure 5:
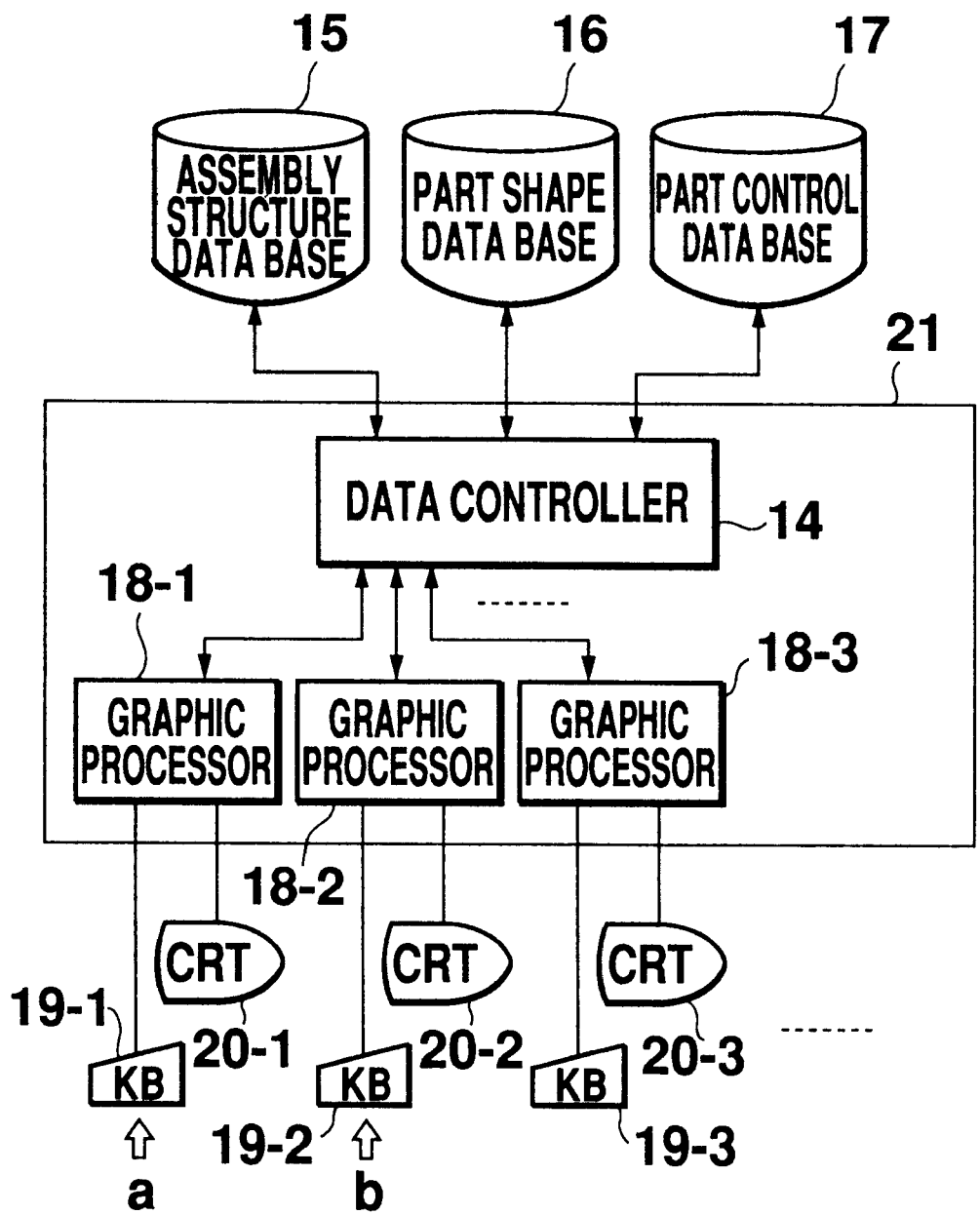
FIG. 5 is a block diagram of another embodiment of a teamwork CAD system according to the present invention.

FIG. 5 shows another embodiment of a teamwork CAD system according to the present invention. In this embodiment, the data controller and the plurality of graphic processors 18-1, 18-2, . . . are not connected by a network as in the first embodiment but provided in a large main computer 21 so that graphic processing and data control are collectively executed by the main computer 21. The same numerals are provided for the elements which are the same as those in the first embodiment shown in FIG. 1. Since the function and operation of each element are the same as in FIG. 1, explanation thereof is omitted.

In these embodiments, the fact that modification has taken place and the nature thereof are transmitted to the designer who is referring to a part every time the part is modified.

When there is a fear of causing confusion if every modification including a modification for trial and error is transmitted, the nature of modification may be transmitted periodically or when a predetermined quantity of modification has been carried out.

As described above, according to the present invention, since if any part is modified, the fact that modification has taken place and the nature of the modification are transmitted to the designer who is referring to the part, the designers can design their respective parts while referring to the latest state of any other necessary part. Therefore, the communication between the designers become smooth and it is easy to check the interference between the parts. It is thus possible to shorten the time required for designing as a whole and to improve the quality of the design.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A teamwork CAD system for designing an object by a plurality of designers who design in parallel the respective parts of said object to which they are assigned using a plurality of data processing units, said system comprising:

a part shape data base for storing the data on the shape of each part;

a part control data base for registering the data on the designer who is designing or modifying each part at each point of time in correspondence with the data on the designer who is referring to said part;

a data control unit for updating the corresponding part shape data in said part shape data base in accordance with the nature of the modification when a part is modified in one of said data processing units, for retrieving and extracting designer information referring to said part and designer which has been modified from said part control data base, and for transmitting the fact that said part has been modified and the nature of the modification to the data processing unit of the extracted designer information; and an assembly structure data base storing structural data of the parts of the object.

2. A teamwork CAD system according to claim 1, wherein said part control data base is capable of registering a plurality of designers who are referring to a part, and said data control unit transmits said fact and said nature of modification to said data processing units of all of said designers who correspond to designer information retrieved and extracted from said part control data base.

3. A teamwork CAD system according to claim 1, wherein each of said plurality of data processing units includes a display unit which is capable of displaying the assembly of the part which is being modified and the part which is being referred to in the latest state on the same screen.

4. A teamwork CAD system according to claim 1, further comprising a monitor for monitoring the progress of designing of all of said parts which are being designed using said plurality of data processing units.

5. A teamwork CAD system according to claim 1, wherein said CAD system is a distributed CAD system in which said plurality of data processing units and said data control unit are connected with each other by a network.

6. A teamwork CAD system according to claim 1, wherein said CAD system is a synthetic CAD system in which said plurality of data processing units and said data control unit are connected with each other by internal buses.

7. A teamwork CAD system according to claim 1, wherein, every time a part is modified by one said plurality of data processing unit, said data control unit retrieves and extracts designer information referring to said part and transmits said fact and said nature of modification to the data processing unit of said designer.

8. A teamwork CAD system according to claim 1, wherein, when a part is continously modified a number of times by one of said plurality of data processing units, said data control unit retrieves and extracts designer information referring to said part and transmits said fact and said nature of modification to the data processing unit of said designer at every predetermined period of time.

9. A teamwork CAD system according to claim 1, wherein, when a part is continously modified a number of times by one of said plurality of data processing units, said data control unit retrieves and extracts designer information referring to said part and transmits said fact and said nature of modification to the data processing unit of said designer at every predetermined number of times of modification.

10. A process for teamwork designing an object by a plurality of designers who design in parallel the respective parts of said object to which they are assigned using a CAD system provided with a part shape data base for storing the data on the shape of each part, an assembly structure data base storing structural data of the parts of the object, and a plurality of data processing units, said processing comprising the steps of:

accessing data of the parts of the object from the assembly structure data base to determine relationships between parts;

registering the data on the designer who designs or modifies each part at each point of time in a part control data base in correspondence with the data on the designer who is referring to said part;

updating the corresponding part shape data in said part shape data base in accordance with the nature of the modification when a part is modified in one of said data processing units;

retrieving and extracting designer information referring to said part and designer which has been modified from said part control data base; and transmitting the fact that said part has been modified and the nature of the modification to the data processing unit of the extracted designer information.

* * * * *